United States Patent [19]

Funahashi et al.

[11] Patent Number: 5,246,212
[45] Date of Patent: Sep. 21, 1993

[54] FLUID-FILLED ELASTIC MOUNT HAVING VACUUM-RECEIVING CHAMBER AND AUXILIARY AIR CHAMBER FOR ACCOMMODATING VOLUMETRIC CHANGE OF EQUILIBRIUM CHAMBER

[75] Inventors: Yoshiki Funahashi, Iwakura; Akiyoshi Ide, Inuyama; Atsushi Muramatsu, Komaki, all of Japan

[73] Assignee: Tokai Rubber Industries, Ltd., Japan

[21] Appl. No.: 920,647

[22] Filed: Jul. 28, 1992

[30] Foreign Application Priority Data

Jun. 18, 1991 [JP] Japan ................................. 3-174579

[51] Int. Cl.$^5$ .............................................. F16F 13/00
[52] U.S. Cl. .............................. 267/140.13; 267/219; 180/312; 248/562; 248/636
[58] Field of Search .................. 267/140.11, 140.13, 267/140.14, 140.15, 219, 35; 248/562, 636; 188/267; 180/300, 312, 902

[56] References Cited

U.S. PATENT DOCUMENTS

| | | | |
|---|---|---|---|
| 4,657,227 | 4/1987 | Hofmann | 267/35 |
| 4,657,232 | 4/1987 | West | 267/140.13 |
| 4,671,227 | 6/1987 | Hollerweger et al. | 180/312 X |
| 4,712,777 | 12/1987 | Miller | 267/140.13 |
| 4,828,234 | 5/1989 | Hoying et al. | 267/140.14 |
| 4,840,358 | 6/1989 | Hoying et al. | 267/140.14 |
| 4,901,986 | 2/1990 | Smith | 267/140.14 |
| 5,114,124 | 5/1992 | Muramatsu | 267/140.13 |
| 5,145,156 | 9/1992 | Muramatsu et al. | 267/140.14 |
| 5,167,403 | 12/1992 | Muramatsu et al. | 267/140.13 |
| 5,170,998 | 12/1992 | Muramatsu | 267/140.13 |

FOREIGN PATENT DOCUMENTS

| | | |
|---|---|---|
| 0262544 | 4/1988 | European Pat. Off. |
| 0324613 | 7/1989 | European Pat. Off. |
| 0440260 | 8/1991 | European Pat. Off. |
| 2663706 | 12/1991 | France . |

OTHER PUBLICATIONS

Patents Abstracts of Japan, vol. 15 No. 329 (M-1149) Aug. 21, 1991 JP-A-3-125045 (Toyo Tire & Rubber Co Ltd).
Patent Abstracts of Japan, vol. 11 No. 135 (M-585) (2582) Apr. 28, 1987 JP-A-61-274 132 (Toyoda Gosei Co Ltd).

*Primary Examiner*—Robert J. Oberleitner
*Assistant Examiner*—Kevin D. Rutherford
*Attorney, Agent, or Firm*—Parkhurst, Wendel & Rossi

[57] ABSTRACT

A fluid-filled elastic mount including first and second support members and an elastic body interposed between these support members for elastically connection thereof. The elastic mount has a pressure-receiving chamber partially defined by the elastic body, first and second equilibrium chambers defined by first and second flexible diaphragms and communicating with the pressure-receiving chamber through first and second orifice passages, respectively, and a vacuum-receiving chamber which is separated by the second diaphragm from the second equilibrium chamber. In operation, the vacuum-receiving chamber is selectively subjected to a sub-atmospheric pressure or exposed to the atmosphere to control the elastic deformation of the second diaphragm. The elastic mount further has an auxiliary air chamber which cooperates with the vacuum-receiving chamber to accommodate a volumetric change of the second equilibrium chamber when the vacuum-receiving chamber is exposed to the atmosphere.

11 Claims, 3 Drawing Sheets

FLUID-FILLED ELASTIC MOUNT HAVING VACUUM-RECEIVING CHAMBER AND AUXILIARY AIR CHAMBER FOR ACCOMMODATING VOLUMETRIC CHANGE OF EQUILIBRIUM CHAMBER

BACKGROUND OF THE INVENTION

1. Field of the Invention

The present invention relates in general to a fluid-filled elastic mount for damping or isolating vibrations based on flow of a fluid contained therein. More specifically, the present invention is concerned with such a fluid-filled elastic mount which utilizes a sub-atmospheric or vacuum pressure so as to exhibit different vibration damping or isolating characteristics depending upon the type of the vibrations applied thereto.

2. Discussion of the Related Art

As one type of vibration damping devices such as an engine mount for a motor vehicle, there is known a so-called fluid-filled elastic mount which includes a first and a second support structure that are spaced apart from each other and elastically connected to each other by an elastic body interposed therebetween. The fluid-filled elastic mount has a pressure-receiving chamber and a variable-volume equilibrium chamber which are filled with a suitable non-compressible fluid, and an orifice passage which premits flow of the fluid therethrough between the two fluid chambers. The pressure of the fluid in the pressure-receiving chamber changes upon application of vibrations. The fluid-filled elastic mount of the above type damps the input vibrations, based on resonance of a mass of the fluid flowing through the orifice passage, more effectively than an elastic mount which relies only upon the elasticity of the elastic body for damping the vibrations.

Generally, the elastic mount is required to exhibit different vibration damping or isolating characteristics depending upon the type of the vibrations applied thereto. For example, the elastic mount when used as a vehicle engine mount is required to exhibit high damping capability with respect to low-frequency vibrations, such as engine shake and bounce, and to provide a reduced dynamic spring constant with respect to middle- to high-frequency vibrations, such as engine idling vibrations.

However, the fluid-filled elastic mount constructed as described above can provide a sufficiently high damping effect based on the resonance of the fluid mass in the orifice passage, only with respect to the vibrations whose frequencies are in the neighborhood of the frequency to which the orifice passage is tuned. Therefore, it is extremely difficult for the known elastic mount to effectively damp or isolate two or more types of vibrations. Thus, the known elastic mount is not satisfactory in its vibration damping or isolating capability.

In view of the above, the assignee of the present application proposed a fluid-filled elastic mount having first and second support structures connected by an elastic body, a pressure-receiving chamber partially defined by the elastic body to receive applied vibrations, first and second equilibrium chambers partially defined by first and second flexible diaphragms, respectively, first and second orifice passages communicating with the pressure-receiving chamber and the first and second equilibrium chambers, respectively, as disclosed in U.S. patent application Ser. No. 07/718,425 filed Jun. 20, 1991 now U.S. Pat. No. 5,170,998. In the proposed elastic mount, the second orifice passage is tuned to a higher frequency than the first orifice passage. Further, a vacuum-receiving chamber is formed behind the second flexible diaphragm partially defining the second equilibrium chamber, such that the vacuum-receiving chamber is selectively exposed to the atmosphere or connected to a vacuum pressure source for supplying a sub-atmospheric pressure lower than the atmospheric pressure, so as to control elastic deformation of the second diaphragm and flow of the fluid through the second orifice passage.

In the thus constructed elastic mount, when the vacuum-receiving chamber is connected to the vacuum pressure source, the second flexible diaphragm is drawn onto the bottom wall of the chamber, whereby volumetric changes of the second equilibrium chamber and the fluid flow through the second orifice passage are prevented. Upon application of low-frequency vibrations, therefore, the fluid is forced to flow through the first orifice passage so that the mount provides a high vibration damping effect due to the first orifice passage. When the vacuum-receiving chamber is exposed to the atmosphere, on the other hand, the vacuum-receiving chamber having a given volume appears behind the second diaphragm, so as to allow elastic deformation of the second diaphragm and volumetric changes of the second equilibrium chamber Upon application of high-frequency vibrations, the fluid is forced to flow through the second orifice passage so that the mount provides a high vibration isolating effect due to the second orifice passage. Thus, the elastic mount exhibits different vibration damping or isolating characteristics depending upon the type of the vibrations applied thereto, based on the fluid flow through a selected one of the first and second orifice passages, by selectively connecting the vacuum-receiving chamber to the vacuum pressure source or the atmosphere.

Further study and analysis by the inventors of the present application revealed that the elastic mount as described above may not be able to stably provide a sufficiently high vibration isolating effect based on the fluid flow through the second orifice passage, because of the constructions of an air passage and a switch valve which are connected to the vacuum-receiving chamber, even when the vacuum-receiving chamber communicates with the atmosphere. Thus, the elastic mount as described above has a room for improvement in its vibration isolating capability.

Namely, even when the vacuum-receiving chamber of the above elastic mount communicates with the atmosphere, the air passage and switch valve apply resistance to the air flowing therethrough, whereby the vacuum-receiving chamber is not fully exposed to the atmosphere, and acts as if it were air-tightly enclosed. As a result, the vacuum-receiving chamber functions as an air spring, and is not able to sufficiently permit or accommodate the elastic deformation of the second diaphragm and the volumetric changes of the second equilibrium chamber. Consequently, effective flow of the fluid is less likely to occur through the second orifice passage, resulting in deterioration in the vibration isolating capability of the elastic mount.

To solve the problem as described above, it is proposed to employ an air passage and a switch valve having relatively large diameters, so as to reduce the resistance to the air flowing therethrough as much as possible. If the flow resistance in the air passage is excessively reduced, however, the elastic mount suffers from an increased rate or speed of evacuating the vacuum-receiving chamber when this chamber is connected to the vacuum pressure source. Upon connection of the vacuum-receiving chamber to the vacuum pressure source, therefore, a member which is supported by the first support member is likely to undergo displacement due to a shock or receive a vibrational load.

More specifically, when the vacuum-receiving chamber is connected to the vacuum pressure source, the volume of the second equilibrium chamber is increased as a result of elimination of the vacuum-receiving chamber which has been evacuated. As a result, the fluid in the mount is caused to flow from the pressure-receiving chamber to the second equilibrium chamber through the second orifice passage, in an amount corresponding to the increased volume of the second equilibrium chamber. At the same time, the fluid is caused to flow from the first equilibrium chamber to the pressure-receiving chamber, to compensate for a portion of the fluid which has been fed from the pressure-receiving chamber to the second equilibrium chamber. If the rate of evacuating the vacuum-receiving chamber is increased due to the reduced flow resistance in the air passage, the rate of reduction in the volume of the pressure-receiving chamber is so largely increased that the pressure of the fluid in the pressure-receiving chamber is undesirably lowered due to relatively slow fluid supply from the first equilibrium chamber through the first orifice passage. Due to the reduced pressure in the pressure-receiving chamber, the elastic body is deformed toward the pressure-receiving chamber, causing displacement of the first support member, whereby the member supported by the support member is likely to undergo shock-induced displacement or receive vibrations.

SUMMARY OF THE INVENTION

It is therefore a first object of the present invention to provide a fluid-filled elastic mount which utilizes a sub-atmospheric pressure to exhibit different vibration damping or isolating characteristics depending upon the type of vibrations applied thereto, and which is simple in construction and stably assures improved vibration damping and isolating effects due to fluid flow through the first and second orifice passages, without suffering from deterioration of its vibration isolating capability upon exposure of a vacuum-receiving chamber to the atmosphere.

It is a second object of the invention to provide a technique for effectively alleviating or preventing vibrations or shocks which may occur upon connection of the vacuum-receiving chamber to a vacuum pressure source when the elastic mount is required to damp vibrations based on the fluid flow through the first orifice passage.

The first object may be attained according to the principle of the present invention, which provides a fluid-filled elastic mount for flexibly connecting two members, comprising: (a) a first support member and a second support member which are respectively fixed to the two members to be flexibly connected, and which are spaced apart from each other in a load-receiving direction in which vibrations are applied to the elastic mount; (b) an elastic body interposed between the first and second support members for elastically connecting the first and second support members; (c) the elastic body at least partially defining a pressure-receiving chamber which is filled with a non-compressible fluid, a pressure of the fluid in the pressure-receiving chamber changing due to elastic deformation of the elastic body upon application of the vibrations in the load-receiving direction; (d) a first flexible diaphragm partially defining a first equilibrium chamber filled with the non-compressible fluid, the first flexible diaphragm being elastically deformable so as to permit a volumetric change of the first equilibrium chamber; (e) means for defining a first orifice passage which communicates with the pressure-receiving chamber and the first equilibrium chamber so as to permit flow of the fluid therebetween; (f) a second flexible diaphragm partially defining a second equilibrium chamber filled with the non-compressible fluid, the second flexible diaphragm being elastically deformable so as to permit a volumetric change of the second equilibrium chamber; (g) means for defining a second orifice passage which communicates with the pressure-receiving chamber and the second equilibrium chamber so as to permit flow of the fluid therebetween, the second orifice passage having a ratio of a cross sectional area thereof to a length thereof, which ratio is higher than that of the first orifice passage; (h) means for defining a vacuum-receiving chamber which is separated from the second equilibrium chamber by the second flexible diaphragm, for permitting elastic deformation of the second flexible diaphragm; (i) pressure control means for selectively applying a sub-atmospheric pressure to the vacuum-receiving chamber to evacuate the vacuum-receiving chamber, so as to restrict the elastic deformation of the second flexible diaphragm; and (j) a third flexible diaphragm partially defining an auxiliary air chamber which communicates with the vacuum-receiving chamber so as to accommodate a volumetric change of the vacuum-receiving chamber, the third flexible diaphragm being elastically deformable so as to permit a volumetric change of the auxiliary air chamber.

In the fluid-filled elastic mount constructed as described above, the auxiliary air chamber serves to accommodate or compensate for the volumetric change of the vacuum-receiving chamber when this chamber communicates with the atmosphere, so as to effectively prevent the vacuum-receiving chamber from functioning as an air spring due to the flow resistance in an air passage through which the sub-atmospheric pressure is applied. Thus, the present elastic mount effectively and stably exhibits desired vibration damping and isolating effects based on flow of the fluid through the first and second orifice passages.

To accomplish the second object of the invention, the present elastic mount may further include means for defining an air passage through which the sub-atmospheric pressure is applied to the vacuum-receiving chamber, and flow-restricting means disposed in the air passage, for limiting a rate of evacuating the vacuum-receiving chamber upon application of the sub-atmospheric pressure.

In the fluid-filled elastic mount having the flow restricting means in the air passage for the sub-atmospheric pressure, the vibration damping/isolating characteristics of the mount may be considerably smoothly changed by applying the sub-atmospheric pressure to the vacuum-receiving chamber through the flow-restricting means, without suffering from vibrations or shocks which may occur upon change of the vibration damping/isolating characteristics.

BRIEF DESCRIPTION OF THE DRAWINGS

The above and optional objects, features and advantages of the present invention will be better understood by reading the following detailed description of a presently preferred embodiment of the invention, when considered in connection with the accompanying drawings, in which.

DETAILED DESCRIPTION OF THE PREFERRED EMBODIMENTS

Figure 1:
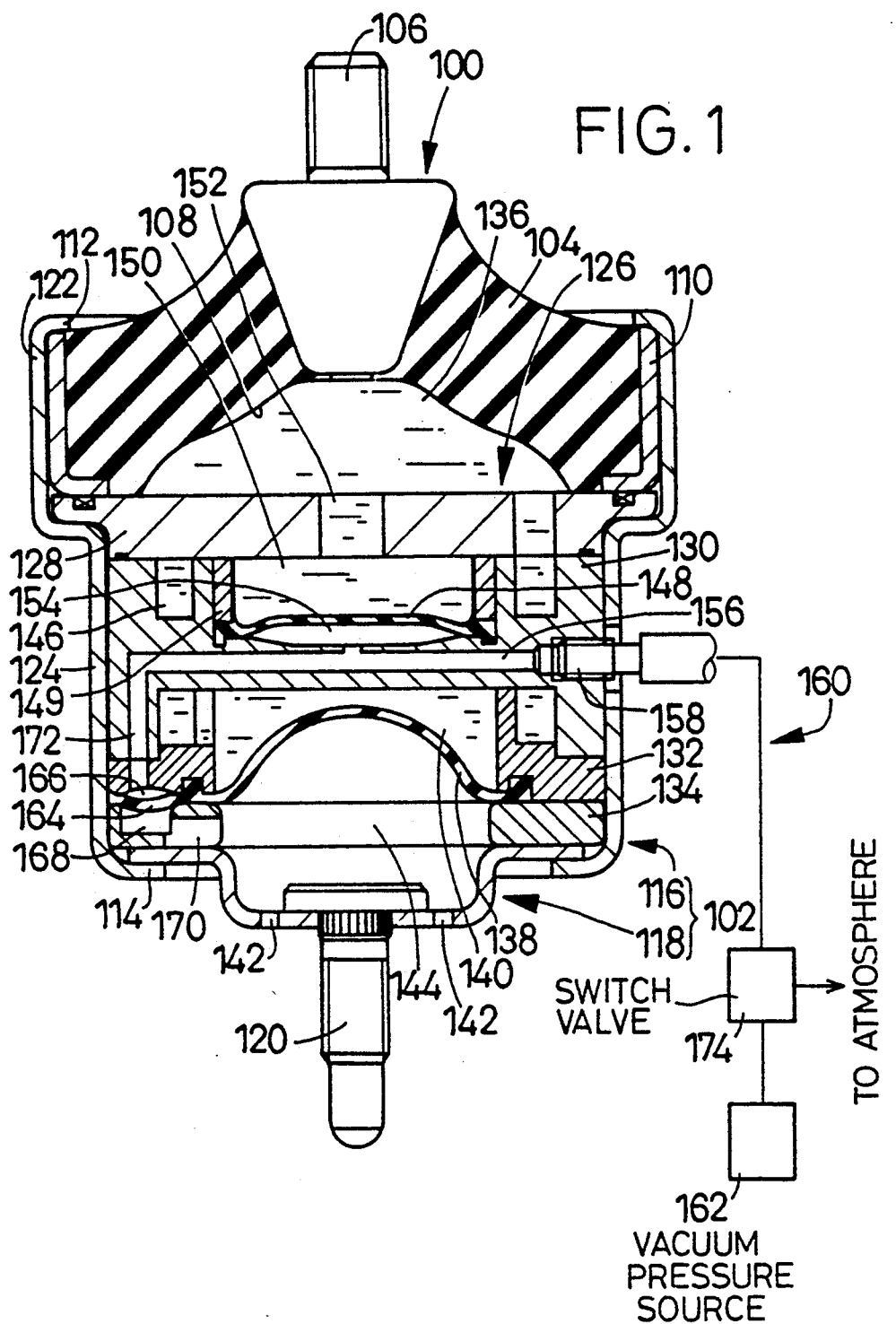
FIG. 1 is an elevational view in axial cross section of one embodiment of a fluid-filled elastic mount of the present invention in the form of an engine mount for a motor vehicle.

Referring first to FIG. 1 showing the vehicle engine mount as one embodiment of the fluid-filled elastic mount of this invention, reference numerals 100 and 102 denote a first and a second support member made of metal, respectively. These first and second support members 100, 102 are opposed to each other and spaced apart from each other by a suitable distance, in a load-receiving direction in which vibrations are received by the engine mount. Between the first and second support members 100, 102, there is formed an elastic body 104 such that the two members 100, 102 are elastically connected to each other by the elastic body 104. The instant engine mount is installed on a motor vehicle such that the first support member 100 is fixed to an engine unit including the engine of the vehicle, while the second support member 102 is fixed to the body of the vehicle. Thus, the engine unit is flexibly mounted on the vehicle body via the engine mount in a vibration damping or isolating manner. With the engine mount installed in position on the vehicle as described above, the weight of the engine unit acts on the mount in the direction (vertical direction as viewed in FIG. 1) in which the first and second support members 100, 102 are opposed to each other, whereby the elastic body 104 is elastically deformed or contracted so that the two support members 100, 102 are moved toward each other from their pre-installation positions by a suitable distance in the above-indicated direction. The instant engine mount is adapted to damp or isolate the input vibrations which are applied primarily in the direction in which the first and second support members 100, 102 are opposed to each other, that is, the above-indicated load-receiving direction.

More specifically, the first support member 100 is a metallic member having a generally truncated conical shape. A mounting bolt 106 is formed integrally with the first support member 100 such that the bolt 106 protrudes in the load-receiving direction from a central portion of the large-diameter end face of the support member 100, axially outwardly of the engine mount. The engine mount is fixed to the vehicle engine unit through the mounting bolt 106.

The above-indicated elastic body 104 is secured by vulcanization to the first support member 100. This elastic body 104 has a generally truncated conical shape, and is formed with a cavity 108 which is open in its large-diameter end face on the side of the second support member 102. The first support member 100 is bonded by vulcanization to the small-diameter end face of the elastic body 104, while a cylindrical metallic connecting member 110 is bonded by vulcanization to the outer circumferential surface of a large-diameter end portion of the elastic body 104. Thus, the first support member 100, elastic body 104 and connecting member 110 are formed into an integral unit, by means of vulcanization of a suitable rubber material for the elastic body 104.

The second support member 102 consists of a generally cylindrical member 116 with axially opposite caulked portions 112, 114, and a generally dish-like bottom member 118 fixed to the cylindrical member 116. The cylindrical member 116 includes a large-diameter portion 122, a small-diameter portion 124 and a shoulder portion connecting the large-diameter and small-diameter portions 122, 124. The bottom member 118 is fixed to the axial open end of the small-diameter portion 124 of the cylindrical member 116, so as to close one opening of the member 116. Thus, the second support member 102 as a whole is a generally cup-shaped member having a large depth. A mounting bolt 120 is formed on the second support member 102 so as to protrude in the load-receiving direction from a central portion of the bottom member 118, axially outwardly of the engine mount. The engine mount is fixed to the vehicle body through the mounting bolt 120.

The above-indicated connecting member 110 secured to the outer surface of the elastic body 104 is fitted in the large-diameter portion 122 of the cylindrical member 116 of the second support member 102. Thus, the second support member 102 is assembled with the integral unit of the first support member 100, elastic body 104 and connecting member 110. In this condition, the first and second support members 100, 102 are opposed to each other in the load-receiving direction (vertical direction as viewed in FIG. 1) with a suitable spacing therebetween, with the elastic body 104 interposed between these two support members 100, 102 for flexible connection therebetween.

Within the small-diameter portion 124 of the cylindrical member 116 of the second support member 102, there is accommodated a thick-walled, generally circular partition structure 126 which extends in a direction substantially perpendicular to the load-receiving direction. The partition structure 126 consists of generally disc-like first and second partition members 132, 134. These annular third and fourth partition members 132, 134. These four partition members 128, 130, 132, 134 are coaxially superposed on each other in the axial direction of the engine mount, and are fixedly attached to the second support member 102.

Between the first support member 100 and the first partition member 128 of the partition structure 126, there is formed a pressure-receiving chamber 136 which is partially defined by the elastic body 104. The pressure-receiving chamber 136 is filled with a suitable non-compressible fluid, such as water, alkylene glycol, polyalkylene glycol and silicone oil. When a vibrational load is applied between the first and second support members 100, 102, a pressure of the fluid in the pressure-receiving chamber 136 changes as a result of a volumetric change of the same chamber 136 due to elastic deformation of the elastic body 104.

Between the partition structure 126 and the bottom member 118 of the second support member 102, on the other hand, there is formed an enclosed space which is separated from the pressure-receiving chamber 136 by the partition structure 126. A first flexible diaphragm 138 is disposed within the enclosed space such that the outer peripheral portion of the diaphragm 138 is fluid-tightly gripped by and between the third and fourth partition members 132, 134. The enclosed space between the partition structure 126 and the bottom member 118 is divided by the first diaphragm 138 into two sections, i.e., a first variable-volume equilibrium chamber 140 and a first air chamber 144. The first equilibrium chamber 140, which is formed between the first diaphragm 138 and the second partition member 130, is filled with the non-compressible fluid as described above. The equilibrium chamber 140 will not undergo pressure changes upon application of vibrations to the engine mount, since the pressure changes are absorbed by volumetric changes of the chamber 140 due to elastic deformation of the first diaphragm 138. The air chamber 144, which is formed between the first diaphragm 138 and the bottom member 118, is held in communication with the atmosphere through through-holes 142 formed through the bottom member 118, so as to allow the elastic deformation of the first diaphragm 138.

The partition structure 126 has a first orifice passage 146 formed in the circumferential direction through radially outer portions of the first, second and third partition members 128, 130, 132, over a predetermined circumferential length (which is longer than one round and shorter than two rounds in this embodiment). This first orifice passage 146 communicates at one of opposite ends with the pressure-receiving chamber 136, and at the other end with the first equilibrium chamber 140, to thereby allow restricted flow of the fluid therethrough between these two chambers 136, 140.

Between the mutually facing surfaces of the first and second partition members 128, 130 of the partition structure 126, there is formed a space which is substantially separated from the pressure-receiving chamber 136 and the first equilibrium chamber 140. Within this space formed in the partition structure 126, there is provided a second flexible diaphragm 148 such that a retainer ring 149 secured by vulcanization to the outer peripheral portion of the diaphragm 148 is fluid-tightly gripped by and between the first and second partition members 128, 130.

The above-indicated space between first and second partition members 128, 130 is divided by the second diaphragm 148 into a second variable-volume equilibrium chamber 150 and a vacuum-receiving chamber 154. The second equilibrium chamber 150, which is formed between the second diaphragm 148 and the first partition member 128, is filled with the non-compressible fluid described above. This second equilibrium chamber 150 will not undergo pressure changes upon application of vibrations to the engine mount, since the pressure changes are absorbed by volumetric changes of the chamber 150 due to elastic deformation of the diaphragm 148. The vacuum-receiving chamber 154, which is formed between the second diaphragm 48 and the second partition member 130, is adapted to allow the elastic deformation of the second diaphragm 148. The second diaphragm 148 is formed in convex configuration to protrude toward the second equilibrium chamber 150 based on its elasticity. Accordingly, the vacuum-receiving chamber 154 having a given volume appears behind the second diaphragm 148 when the chamber 154 is held in communication with the atmosphere.

The first partition member 128 has a second orifice passage 152 formed at its central portion through the entire thickness thereof in the axial direction of the mount. This second orifice passage 152 communicates with the second equilibrium chamber 150 and the pressure-receiving chamber 136, to allow flow of the fluid therethrough between the two chambers 150, 136. As is apparent from FIG. 1, the second orifice passage 152 has a larger cross sectional area and a smaller flow length than the first orifice passage 146. Namely, the ratio of the cross sectional area to the length of the second orifice passage 152 is larger than that of the first orifice passage 146. Accordingly, the resonance frequency of the fluid in the second orifice passage 152 is set to be higher than that of the fluid in the first orifice passage 146.

In the instant embodiment, the first orifice passage 146 is tuned so that the engine mount is able to effectively damp low-frequency vibrations, such as engine shake or bounce, based on the resonance of a mass of the fluid in the passage 146. On the other hand, the second orifice passage 152 is tuned so that the engine mount provides a sufficiently reduced dynamic spring constant with respect to middle-frequency vibrations, such as engine idling vibrations, based on the resonance of a mass of the fluid in the passage 152.

The vacuum-receiving chamber 154 communicates with the exterior space, through an air passage 156 formed through the second partition member 130, and a connector 158 screwed into an open end portion of the air passage 156. With the engine mount installed in position with an air conduit 160 connected to the connector 158, the vacuum-receiving chamber 154 is selectively exposed to the atmosphere or connected to a vacuum pressure source 162, through the air conduit 160 via a switch valve 174.

Between the mutually facing surfaces of the third and fourth partition members 132, 134 of the partition structure 126, there is formed a space which extends over a given length in the circumferential direction of the mount, and which is substantially separated from the pressure-receiving chamber 136 and the first equilibrium chamber 140. Within this space formed in the partition structure 126, there is provided a third flexible diaphragm 164 such that its outer peripheral portion is fluid-tightly gripped by and between the third and fourth partition members 132, 134. In the instant embodiment, the third diaphragm 164 is formed integrally with the first diaphragm 138. The third diaphragm 164 is formed in convex configuration to protrude toward a second air chamber 168 on the side of the fourth partition member 134, based on its elasticity. Therefore, an auxiliary air chamber 166 having a given volume appears on the side of the third partition member 132 when the chamber 166 is held in communication with the atmosphere.

Namely, the above-indicated space is divided or partitioned by the third diaphragm 164 into the auxiliary air chamber 166 and the second air chamber 168. The auxiliary air chamber 166, which is formed between the third partition member 132 and the third diaphragm 164, is readily allowed to undergo volumetric changes due to the elastic deformation of the third diaphragm 164. The second air chamber 168, which is formed between the third diaphragm 164 and the fourth partition member 134, is adapted to allow the elastic deformation of the third diaphragm 164.

The second air chamber 168 communicates with the first air chamber 144, through a communication hole 170 formed through the fourth partition member 134. Since the second air chamber 168 is exposed to the atmosphere through the first air chamber 144 and through-holes 142, this air chamber 168 is able to readily allow the elastic deformation of the third diaphragm 164 and the volumetric changes of the auxiliary air chamber 166 through the volume of the second air chamber 168 itself is relatively small.

The auxiliary air chamber 166 communicates with the vacuum-receiving chamber 154, through an air passage 172 formed through the second and third partition members 130, 132. Accordingly, the auxiliary air chamber 166 is adapted to accommodate volumetric changes of the vacuum-receiving chamber 154, and thus facilitate the elastic deformation of the second diaphragm 148 based on the volumetric changes of the chamber 154.

When vibrations are applied between the first and second support members 100, 102 of the instant engine mount installed in position on the motor vehicle, the fluid in the mount is forced to flow through the first and second orifice passages 146, 152, between the pressure-receiving chamber 136 and the first and second equilibrium chambers 140, 150, respectively, based on alternate pressure changes arising in the pressure-receiving chamber 136. In operation, the switch valve 174 is selectively placed in a first position for connecting the vacuum-receiving chamber 154 to the vacuum pressure source 162, and a second position for exposing the vacuum-receiving chamber 154 to the atmosphere, so that the fluid is allowed to flow through a selected one of the first and second orifice passages 146, 152. Thus, the instant engine mount satisfactorily exhibits different vibration damping or isolating characteristics based on the resonance of the fluid flowing through the selected orifice passage 146, 152, depending upon the type of the vibrations applied thereto.

More specifically described, when the engine mount receives low-frequency vibrations, such as engine shake or bounce, which should be damped by the fluid flow through the first orifice passage 146, the switch valve 174 is operated to the first position for connecting the vacuum-receiving chamber 154 to the vacuum pressure source 162. As a result, the vacuum-receiving chamber 154 is evacuated so that the second diaphragm 148 is drawn onto the bottom wall of the chamber 154 against its elastic force, whereby the volume of the vacuum-receiving chamber 154 is substantially zeroed and the volume of the second equilibrium chamber 150 is made constant or fixed. Consequently, the fluid in the mount is forced to flow exclusively through the first orifice passage 146 between the pressure-receiving chamber 136 and the first equilibrium chamber 140, based on alternate pressure changes arising in the pressure-receiving chamber 136. Thus, the engine mount provides an excellent vibration damping effect based on the resonance of a mass of the fluid in the first orifice passage 146.

With the vacuum-receiving chamber 154 connected to the vacuum pressure source 162 as described above, the auxiliary air chamber 166 is also subjected to a sub-atmospheric pressure, so that the third diaphragm 164 is drawn onto the bottom wall of the air chamber 166 and the volume of the air chamber 166 is substantially zeroed. In this state, the auxiliary air chamber 166 does not function to accommodate or compensate for the volumetric changes of the vacuum-receiving chamber 154.

When the engine mount receives high-frequency vibrations, such as engine idling vibrations, which should be isolated by the fluid flow through the second orifice passage 152, the switch valve 72 is operated to the second position for exposing the vacuum-receiving chamber 154 to the atmosphere. In this case, the vacuum-receiving chamber 154 having a given volume appears behind the second diaphragm 148, so as to allow the elastic deformation of the second diaphragm 148 so that the volume of the second equilibrium chamber 150 may be changed. Consequently, the fluid is caused to flow through the second orifice passage 152 between the pressure-receiving chamber 136 and the second equilibrium chamber 150, so that the engine mount provides an effectively reduced dynamic spring constant based on the resonance of a mass of the fluid in the second orifice passage 152. In this condition, the first orifice passage 146 is also held in fluid communication with the pressure-receiving chamber 136. However, the fluid hardly flows through the first orifice passage 146 because of its smaller ratio of the cross sectional area to the length, i.e., the larger resistance to the fluid flow therethrough, than the second orifice passage 152.

With the vacuum-receiving chamber 154 exposed to the atmosphere as described above, the auxiliary air chamber 166 also communicates with the atmosphere, and thus appears with a nominal volume behind the third diaphragm 164. Upon application of high-frequency vibrations, therefore, the auxiliary air chamber 166 functions to accommodate the volumetric changes of the vacuum-receiving chamber 154. Namely, the vacuum-receiving chamber 154 may substantially be shut off from the atmosphere since the air conduit 160 and switch valve 174, through which the chamber 154 communicates with the atmosphere, have considerably large resistance to flow of the air therethrough. In this condition, the air is allowed to flow between the vacuum-receiving chamber 154 and the auxiliary air chamber 166, thereby preventing the vacuum-receiving chamber 154 from acting like an air spring as a result of the shut-off of this chamber 154. In this arrangement, the vacuum-receiving chamber 154 effectively and stably allows the elastic deformation of the second diaphragm 148.

Consequently, the volume of the second equilibrium chamber 150 can be changed to a sufficiently large extent due to the elastic deformation of the second diaphragm 148, assuring a sufficiently large amount of the fluid flowing through the second orifice passage 152. Thus, the instant engine mount stably exhibits a desired vibration isolating effect based on the resonance of the fluid flowing through the second orifice passage 152.

Figure 2:
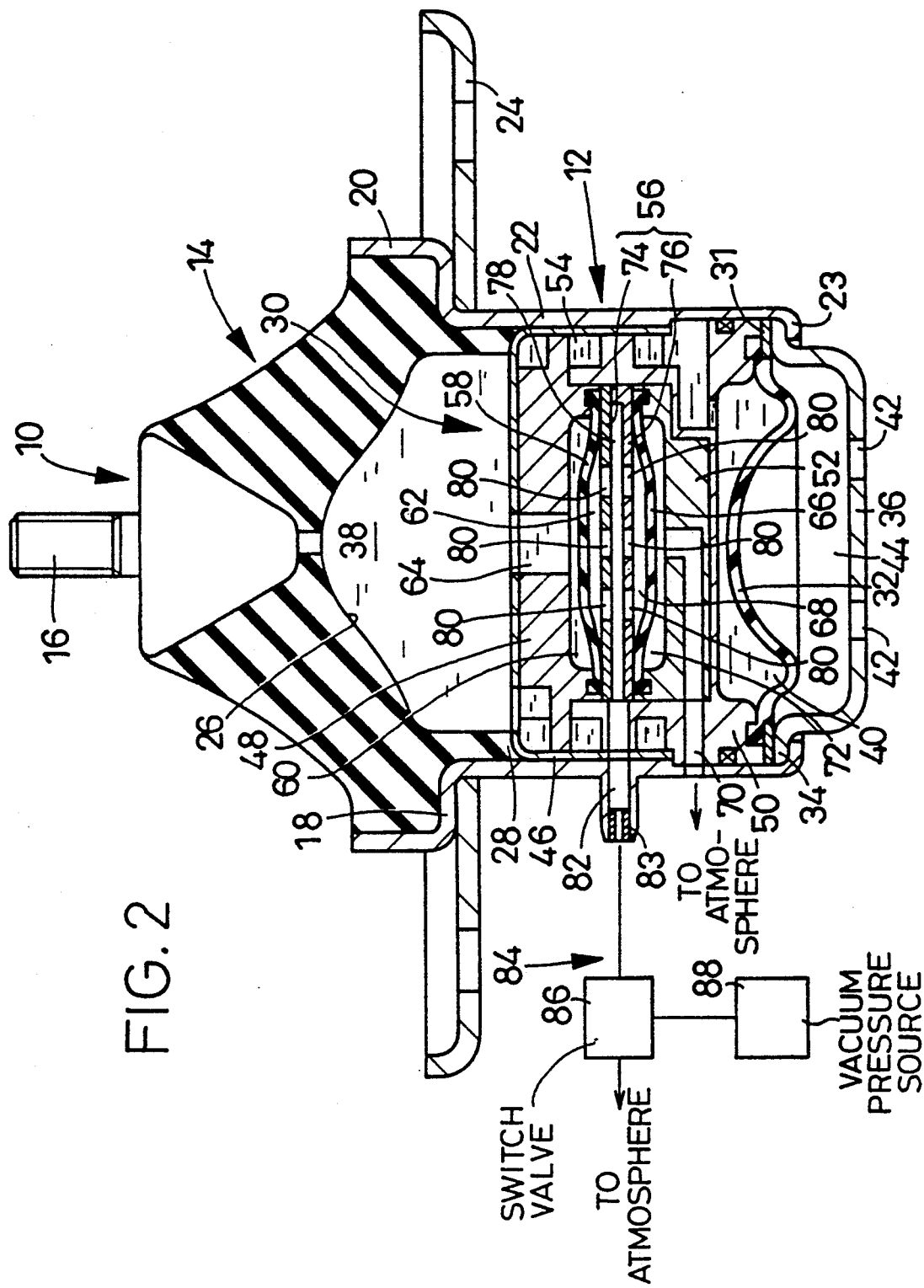
FIG. 2 is an elevational view in axial cross section of another embodiment of a fluid-filled elastic mount of the present invention in the form of an engine mount for a motor vehicle.

Referring next to FIG. 2 showing an engine mount as another embodiment of the fluid-filled elastic mount of this invention, reference numerals 10 and 12 denote a first and a second rigid support member, respectively. These first and second support members 10, 12 are opposed to each other and spaced apart from each other by a suitable distance, in a load-receiving direction in which vibrations are received by the engine mount. Between the first and second support members 10, 12, there is formed an elastic body 14 such that the two members 10, 12 are elastically connected to each other by the elastic body 14. The instant engine mount is installed on a motor vehicle such that the first support member 10 is fixed to an engine unit including the engine of the vehicle, while the second support member 12 is fixed to the body of the vehicle. Thus, the engine unit is flexibly mounted on the vehicle body via the engine mount in a vibration damping or isolating manner. With the engine mount installed in position on the vehicle as described above, the weight of the engine unit acts on the mount in the direction (vertical direction as viewed in FIG. 2) in which the first and second support members 10, 12 are opposed to each other, whereby the elastic body 14 is elastically deformed or contracted so that the two support members 10, 12 are moved toward each other from their pre-installation positions by a suitable distance in the above-indicated direction. The instant engine mount is adapted to damp or isolate the input vibrations which are applied primarily in the direction in which the first and second support members 10, 12 are opposed to each other, that is, the above-indicated load-receiving direction.

More specifically, the first support member 10 is a metallic member having a generally truncated conical shape. A mounting bolt 16 is formed integrally with the first support member 10 such that the bolt 16 protrudes in the load-receiving direction from the large-diameter end face of the support member 10, axially outwardly of the engine mount. The engine mount is fixed to the vehicle engine unit through the mounting bolt 16.

On the other hand, the second support member 12 is a stepped cylindrical metallic member consisting of a large-diameter portion 20, a small-diameter portion 22, and an axially intermediate shoulder portion 18. The second support member 12 further includes a caulked portion 23 formed at the open end of the small-diameter portion 22. A bracket 24 is fixed by welding, for example, to the shoulder portion 18, so as to extend radially outwards from the second support member 12. Thus, the engine mount is fixed to the vehicle body through the bracket 24.

The first and second support members 10, 12 are opposed to each other in the load-receiving direction with a suitable spacing therebetween, in substantially coaxial relationship with each other, such that the large-diameter portion 20 of the second support member 12 is open toward the small-diameter end face of the first support member 10.

With the first and second support members 10, 12 thus disposed in position, the above-indicated elastic body 14 is interposed between these support members 10, 12 so as to flexibly connect the two support members 10, 12. The elastic body 14 has a generally truncated conical shape, and has a cavity 26 formed in its large-diameter end face. The first support member 10 is bonded by vulcanization to the small-diameter end face of the elastic body 14, while the second support member 12 is bonded by vulcanization at the inner circumferential surfaces of the large-diameter portion 20 and shoulder portion 18 to the outer circumferential surface of a large-diameter end portion of the elastic body 14. Thus, the first support member 10, elastic body 14 and second support member 12 are formed into an integral unit, by means of vulcanization of a suitable rubber material for the elastic body 14.

The elastic body 14 includes an annular extension 28 which extends over a suitable axial length along the inner circumferential surface of the small-diameter portion 22 of the second support member 12.

The second support member 12 accommodates therein a thick-walled, generally circular partition structure 30. On an axially outer surface (the lower surface) of the partition structure 30, there are provided a generally disc-like, first flexible diaphragm 32 having an annular metallic member 31 secured to an outer peripheral portion thereof, and a generally dish-like protective metallic member 36 having an outward flange 34 formed at its open peripheral portion. The partition structure 30, first diaphragm 32 and protective member 36 are superposed on each other at their outer peripheral portions, such that these peripheral portions are axially gripped by and between the annular extension 28 of the elastic body 14 and the caulked portion 23 of the second support member 12. Thus, the partition structure 30, first diaphragm 32 and protective member 36 are secured to the second support member 12.

With the partition structure 30 accommodated in the second support member 12, the space within the second support member 12 is fluid-tightly divided by the partition structure 30 into two axially opposite sections, that is, a pressure-receiving chamber 38 partially defined by the elastic body 14, and a first variable-volume equilibrium chamber 40 partially defined by the first diaphragm 32. These pressure-receiving and first equilibrium chambers 38, 40 are filled with a suitable non-compressible fluid, such as water, alkylene glycol, polyalkylene glycol and silicone oil.

Upon application of vibrations to the engine mount, a pressure of the fluid in the pressure-receiving chamber 38 changes as a result of a volumetric change of the same chamber 38 due to elastic deformation of the elastic body 14. On the other hand, the first equilibrium chamber 40 is allowed to readily undergo volumetric changes thereof, since the first diaphragm 32 can be easily deformed in the presence of a first air chamber 44 defined between the first diaphragm 32 and the protective member 36. The protective member 36 covering the first diaphragm 32 is formed with a plurality of through-holes 42, through which the first air chamber 44 communicates with the exterior space.

The partition structure 30 for partitioning the pressure-receiving and first equilibrium chambers 38, 40 is constructed such that an upper and a lower partition member 48, 50 are superposed on each other with a middle partition member 52 interposed therebetween, and are partially fitted in a thin-walled, inverted cup-shaped metallic member 46 which is received in the second support member 12.

The outer peripheral portion of the partition structure 30 is formed with a spiral groove which extends through the upper and lower partition members 48, 50. With this spiral groove covered by the cup-shaped member 46, a first orifice passage 54 is provided which communicates at its opposite ends with the pressure-receiving chamber 38 and the first equilibrium chamber 40 to allow flow of the fluid between these chambers 38, 40. In this embodiment, the length and cross sectional area of the orifice passage 54 are determined so that the engine mount exhibits a high damping effect with respect to an engine shake and other low-frequency vibrations, based on the resonance of a mass of the fluid flowing through the spiral orifice passage 54.

Between the upper and middle partition members 48, 52 of the partition structure 30, there is formed an inner space which is divided by a partition wall 56 interposed between the partition members 48, 52, into a first section on the side of the upper partition member 48 and a second section on the side of the middle partition member 52.

In the first section defined between the partition wall 56 and the upper partition member 48, there is provided a generally disc-like, second flexible diaphragm 58 which fluid-tightly divides the first section into a second equilibrium chamber 60 and a vacuum-receiving chamber 62. The second equilibrium chamber 60, which is defined between the second diaphragm 58 and the upper partition member 48, is filled with the non-compressible fluid as described above. The vacuum-receiving chamber 62, which is defined between the second diaphragm 58 and the partition wall 56, is adapted to allow the elastic deformation of the second diaphragm 58.

The partition structure 30 further has a second orifice passage 64 formed through the upper partition member 48 and cup-shaped member 46. This second orifice passage 64 communicates the second equilibrium chamber 60 with the pressure-receiving chamber 38 so as to allow flow of the fluid between the two chambers 60, 38. The second orifice passage 64 has a larger cross sectional area and a smaller flow length than the first orifice passage 54. Namely, the ratio of the cross sectional area to the length of the second orifice passage 64 is larger than that of the first orifice passage 54. Accordingly, the instant engine mount provides a significantly reduced dynamic spring constant with respect to middle- to high-frequency vibrations such as engine idling vibrations, based on the resonance of a mass of the fluid in the second orifice passage 64.

In the above-indicated second section defined between the partition wall 56 and the middle partition member 52, there is provided a generally disc-like, third flexible diaphragm 66 which fluid-tightly divides the second section into an auxiliary air chamber 68 on the side of the partition wall 56, and a second air chamber 72 on the side of the middle partition member 52. The second air chamber 72, which is defined between the third diaphragm 66 and the middle partition member 52, is open to the atmosphere, through an air passage 70 formed through the middle and lower partition members 52, 50. Thus, the second air chamber 72 serves to allow the elastic deformation of the third diaphragm 66, whereby the volume of the auxiliary air chamber 68 can be easily changed.

The partition wall 56 for partitioning the vacuum-receiving chamber 62 and the auxiliary air chamber 68 consists of upper and lower disc members 74, 76 made of metal, which are superposed on each other with a suitable spacing therebetween. Within the partition wall 56, there is defined an intermediate space 78 between the upper and lower disc members 74, 76. The intermediate space 78 communicates with the vacuum-receiving chamber 62 and the auxiliary air chamber 68, through a plurality of holes 80 formed through the upper and lower disc members 74, 76, respectively. In this arrangement, the auxiliary air chamber 68 is connected to the vacuum-receiving chamber 62 through the intermediate space 78.

The intermediate space 78 is connected to an air passage 82 which is formed through the lower partition member 50, cup-shaped member 46 and second support member 12. A generally cylindrical flow restrictor 83 is fitted in an open end portion of the air passage 82, so as to reduce the diameter of the passage 82. This flow restrictor 83 serves to restrict free flow of the fluid (the air) therethrough, and thus provides a suitable degree of flow resistance to the air flowing therethrough.

With the instant engine mount installed in position on the vehicle, the air passage 82 is connected through an air conduit 84 to pressure control means including a switch valve 86 and a vacuum pressure source 88. The switch valve 86 is selectively placed in a first position for connecting the air passage 82 to the vacuum pressure source 88, and a second position for exposing the passage 82 to the atmosphere, so that the intermediate space 78 communicating with the air passage 82, and the vacuum-receiving chamber 62 and auxiliary air chamber 68 communicating with the intermediate space 78, are selectively connected to the vacuum pressure source 88 or exposed to the atmosphere.

Upon application of a vibrational load to the thus constructed engine mount, the fluid in the mount is forced to flow through a selected one of the first and second orifice passages 54, 64, by selectively placing the switch valve 86 in one of the first and second positions as described above. Thus, the instant engine mount exhibits a high damping effect for low-frequency vibrations, based on the fluid flow through the first orifice passage 54, and provides a reduced dynamic spring constant for middle- to high-frequency vibrations, based on the fluid flow through the second orifice passage 64.

More specifically, when the engine mount receives the low-frequency vibrations, such as engine shake or bounce, which should be damped by the fluid flow through the first orifice passage 54, the switch valve 86 is placed in the first position for connecting the air passage 82 to the vacuum pressure source 88. As a result, the vacuum-receiving chamber 62 and auxiliary air chamber 68 are subjected to a sub-atmospheric pressure which is lower than the atmospheric pressure, through the air passage 82 and intermediate space 78, whereby the second and third diaphragms 58, 66 are drawn onto the upper and lower disc members 74, 76 of the partition wall 56, respectively.

Consequently, the vacuum-receiving chamber 62 is substantially evacuated, and the volume of the second equilibrium chamber 60 is made constant or fixed, whereby the fluid is kept from flowing through the second orifice passage 64. Accordingly, the fluid is forced to effectively flow through the first orifice passage 54 between the pressure-receiving chamber 38 and the first equilibrium chamber 40, based on alternate pressure changes of the pressure-receiving chamber 38 caused by the input vibrations. Thus, the instant engine mount exhibits a high vibration damping effect due to the fluid flow through the first orifice passage 54.

In the engine mount constructed as described above, the speed or rate of evacuating the vacuum-receiving chamber 62 by the vacuum pressure source 88 is limited or reduced by the flow restrictor 83 disposed in the air passage 82. Accordingly, the vacuum-receiving chamber 62 is prevented from being rapidly evacuated when the switch valve 88 is operated to the first position.

Since the speed of evacuating the vacuum-receiving chamber 62 is limited by the flow restrictor 83 as described above, the volume of the second equilibrium chamber 60 is slowly increased as a result of the slow evacuation of the chamber 62, resulting in reduction in the flow rate of the fluid flowing from the pressure-receiving chamber 38 into the equilibrium chamber 60 whose volume has been increased. Accordingly, the pressure of the pressure-receiving chamber 38 is slowly or less rapidly lowered. Consequently, the pressure-receiving chamber 38 is readily replenished with the fluid flowing from the first equilibrium chamber 40 to the pressure-receiving chamber 38, in an amount which corresponds to that of the fluid flowing from the pressure-receiving chamber 38 into the second equilibrium chamber 60, thereby avoiding undesirably large reduction in the volume of the pressure-receiving chamber 38.

It is desirable that the evacuating speed limited by the flow restrictor 83 is determined so that the rate of volume reduction of the pressure-receiving chamber 38 is not so greater as the limit flow rate of the fluid flowing from the first equilibrium chamber 40 to the pressure-receiving chamber 38 through the first orifice passage 54. This effectively alleviates or avoids reduction in the volume or pressure of the pressure-receiving chamber 38.

When the switch valve 86 is operated to the first position for connection with the vacuum pressure source 88, therefore, the instant engine mount is advantageously free from displacement of the first support member 10 due to the rapid reduction in the pressure of the pressure-receiving chamber 38, and from vibrations or shocks caused by the displacement of the first support member 10.

When the engine mount receives the middle- to high-frequency vibrations, such as engine idling vibrations, the switch valve 86 is operated to the second position for exposing the air passage 82 to the atmosphere. In this case, the air is supplied to the vacuum-receiving chamber 62 and auxiliary air chamber 68, through the air passage 82 and intermediate space 78, so that the vacuum-receiving and auxiliary air chambers 62, 68 having respective given volumes appear behind the second and third diaphragms 58, 66, respectively.

Consequently, the vacuum-receiving and auxiliary air chambers 62, 68 cooperate with each other to facilitate elastic deformation of the second diaphragm 58, and thereby accommodate volumetric changes of the second equilibrium chamber 60. Upon application of the vibrations, therefore, the fluid is forced to flow through the second orifice passage 64 between the pressure-receiving chamber 38 and the second equilibrium chamber 60, based on alternate pressure changes of the pressure-receiving chamber 38 caused by the applied vibrations, so that the instant engine mount provides a significantly reduced dynamic spring constant, based on the fluid flow through the second orifice passage 64.

Namely, even if the vacuum-receiving chamber 62 is open to the atmosphere through the air passage 82, this chamber 62 may function as an air spring since free flow of the air into and from the chamber 62 is restricted by the flow restrictor 83 disposed in the air passage 82. Thus, the vacuum-receiving chamber 62 is not necessarily able to allow free elastic deformation of the second diaphragm 58. According to the present invention, however, the vacuum-receiving chamber 62 communicates with the auxiliary air chamber 68 which is partially defined by the third diaphragm 66 whose free deformation is allowed by the second air chamber 72. Accordingly, the volumetric changes of the vacuum-receiving chamber 62 are suitably accommodated by the auxiliary air chamber 68, assuring free elastic deformation of the second diaphragm 58. Consequently, the volume of the second equilibrium chamber 60 can be varied to a large extend, stably assuring effective flow of the fluid through the second orifice passage 64, so that the engine mount provides a significantly reduced dynamic spring constant based on the resonance of the fluid flowing through the orifice passage 64.

Figure 3:
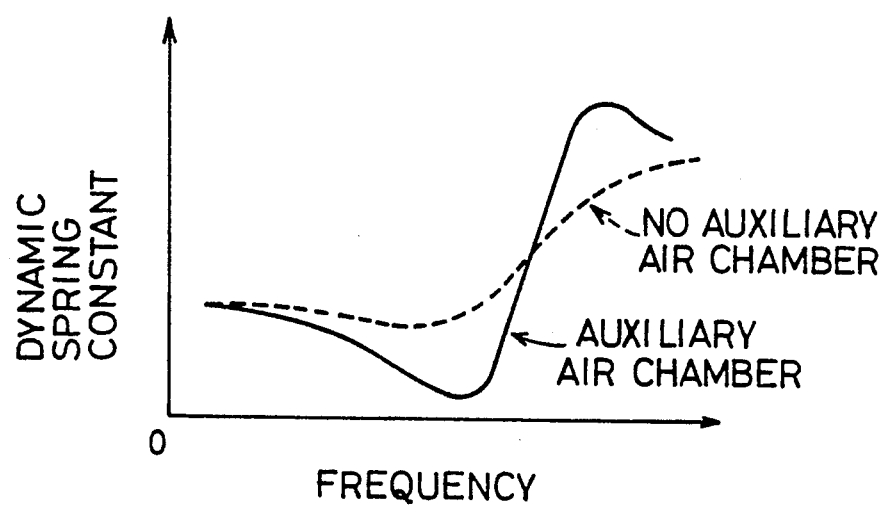
FIG. 3 is a graph showing vibration isolating characteristics of engine mounts with a flow restrictor, in relation to middle- and high-frequency vibrations.

The graph of FIG. 3 shows the results of a test on elastic mounts each having the flow restrictor 83 in the air passage 82 as in the instant embodiment, for measuring a vibration isolating characteristic (dynamic spring constant) with respect to middle- to high-frequency vibrations where the auxiliary air chamber 68 is provided and where the same chamber 568 is not provided. It will be understood from the test results that the vibration isolating characteristic due to the second orifice passage 64 is significantly improved, in the presence of the auxiliary air chamber 68 which serves to compensate for the volume of the vacuum-receiving chamber 62.

It follows that the engine mount constructed as described above stably and effectively exhibits a desired vibration damping or isolating characteristic due to the fluid flow through a selected one of the first and second orifice passage 54, 64, assuring smooth switching between the two orifice passages 54, 64, based on the air-flow restricting function by the flow restrictor 83, and the volume compensation by the auxiliary air chamber 68 for the vacuum-receiving chamber 62.

While the present invention has been described in its presently preferred embodiments with a certain degree of particularity, for illustrative purpose only, it is to be understood that the invention is not limited to the details of the illustrated embodiments, but may be otherwise embodied.

For instance, the position of the auxiliary air chamber formed in the elastic mount is not limited to those of the illustrated embodiments, but may be suitably changed as desired in view of the structure of the elastic mount, so that the auxiliary air chamber thus formed communicates with the vacuum-receiving chamber for accommodating volumetric changes of the second equilibrium chamber.

In the illustrated embodiments, the second air chamber 168, 72 adapted for allowing elastic deformation of the third diaphragm 164, 66 partially defining the auxiliary air chamber 166, 68 is held in communication with the atmosphere. However, the second air chamber 168, 72 does not have to communicate with the atmosphere, where the chamber 168, 72 is given a large volume enough to allow the elastic deformation of the third diaphragm 164, 66.

Where the flow restrictor is provided in the air passage through which the sub-atmospheric pressure is applied, so as to prevent vibrations or shocks upon switching of the first and second orifice passages as in the second embodiment, the position and construction of the flow restrictor is not limited to those of the second embodiment, but may be suitably changed or determined. For instance, the flow restrictor may be disposed at any desired position in the air passage for the sub-atmospheric pressure. Further, the flow restrictor 83 as used in the second embodiment may be replaced by other flow restricting means, for example, the air passage per se whose diameter is reduced.

Further, the constructions and shapes of the first and second orifice passages are never limited to those of the illustrated embodiments, but may be suitably changed depending upon the required vibration damping/isolating characteristics of the elastic mount.

While the first and second orifice passages are formed independently of each other in the illustrated embodiments, the first orifice passage may communicate with the pressure-receiving chamber through the second orifice passage such that the first and second orifice passage are connected in series with each other.

While the illustrated embodiments of the invention are used as an engine mount for a motor vehicle, the principle of the present invention is equally applicable to any fluid-filled elastic mounts other than the engine mount, for example, to a vehicle body mount and a differential gear mount for the vehicle.

It is to be understood that the present invention may be embodied with various other changes, modifications and improvements, which may occur to those skilled in the art, without departing from the scope of the invention defined in the following claims.

What is claimed is:

1. A fluid-filled elastic mount for flexibly connecting two members, comprising:
    a first support member and a second support member which are respectively fixed to the two members to be flexibly connected, and which are spaced apart from each other in a load-receiving direction in which vibrations are applied to the elastic mount;
    an elastic body interposed between said first and second support members for elastically connecting the first and second support members;
    said elastic body at least partially defining a pressure-receiving chamber which is filled with a non-compressible fluid, a pressure of said fluid in said pressure-receiving chamber changing due to elastic deformation of said elastic body upon application of the vibrations in said load-receiving direction;
    a first flexible diaphragm partially defining a first equilibrium chamber filled with said non-compressible fluid, said first flexible diaphragm being elastically deformable so as to permit a volumetric change of said first equilibrium chamber;
    means for defining a first orifice passage which communicates with said pressure-receiving chamber and said first equilibrium chamber so as to permit flow of said fluid therebetween;
    a second flexible diaphragm partially defining a second equilibrium chamber filled with said non-compressible fluid, said second flexible diaphragm being elastically deformable so as to permit a volumetric change of said second equilibrium chamber;
    means for defining a second orifice passage which communicates with said pressure-receiving chamber and said second equilibrium chamber so as to permit flow of said fluid therebetween, said second orifice passage having a ratio of a cross sectional area thereof to a length thereof, which ratio is higher than that of said first orifice passage;
    means for defining a vacuum-receiving chamber which is separated from said second equilibrium chamber by said second flexible diaphragm, for permitting elastic deformation of said second flexible diaphragm;
    pressure control means for selectively applying a sub-atmospheric pressure lower than an atmospheric pressure, to said vacuum-receiving chamber to thereby evacuate the vacuum-receiving chamber, so as to restrict the elastic deformation of said second flexible diaphragm; and
    a third flexible diaphragm partially defining an auxiliary air chamber which communicates with said vacuum-receiving chamber so as to accommodate a volumetric change of said vacuum-receiving chamber, said third flexible diaphragm being elastically deformable so as to permit a volumetric change of said auxiliary air chamber.

2. A fluid-filled elastic mount according to claim 1, wherein said means for defining a first orifice passage and said means for defining a second orifice passage comprise a partition structure supported by said second support member, said pressure-receiving chamber being formed on one of opposite sides of said partition structure on the side of said first support member while said first equilibrium chamber being formed on the other side of said partition structure.

3. A fluid-filled elastic mount according to claim 2, wherein said partition structure has a first enclosed space which is divided by said second flexible diaphragm into said second equilibrium chamber and said vacuum-receiving chamber.

4. A fluid-filled elastic mount according to claim 3, wherein said partition structure has a second enclosed space which is divided by said third flexible diaphragm into said auxiliary air chamber and an air chamber which communicates with the atmosphere, said second enclosed space being substantially independent of said first enclosed space.

5. A fluid-filled elastic mount according to claim 4, wherein said partition structure has an air passage which communicates with said vacuum-receiving chamber and said auxiliary air chamber.

6. A fluid-filled elastic mount according to claim 5, wherein said partition structure has another air passage for connecting said pressure control means to said vacuum-receiving chamber, said another air passage communicating with said air passage.

7. A fluid-filled elastic mount according to claim 4, wherein said first equilibrium chamber and said second support member cooperates with each other to define another air chamber which permits elastic deformation of said first flexible diaphragm, said air chamber in said second enclosed space communicating with the atmosphere through said another air chamber.

8. A fluid-filled elastic mount according to claim 4, further comprising a partition wall supported by said partition structure, for partitioning said first enclosed space and said second enclosed space, said partition wall having a plurality of holes and an internal space for communication between said vacuum-receiving chamber and said auxiliary air chamber, said pressure control means being connected to said vacuum-receiving chamber through said internal space.

9. A fluid-filled elastic mount according to claim 1, further comprising means for defining an air passage through which the sub-atmospheric pressure is applied to said vacuum-receiving chamber by said pressure control means, and flow-restricting means disposed in said air passage, for limiting a speed of evacuating said vacuum-receiving chamber upon application of the sub-atmospheric pressure.

10. A fluid-filled elastic mount according to claim 1, wherein said pressure control means comprises switching means which is operable between a first position for applying said sub-atmospheric pressure to said vacuum-receiving chamber, and a second position for exposing said vacuum-receiving chamber to the atmosphere, said non-compressible fluid flowing substantially exclusively through said first orifice passage when said switching means is placed in said first position, and through said second orifice passage when said switching means is placed in said second position.

11. A fluid-filled elastic mount according to claim 10, wherein said pressure control means further comprises a vacuum pressure source for supplying said vacuum-receiving chamber with said sub-atmospheric pressure when said switching means is placed in said first position.

* * * * *